US012433454B2

United States Patent
Luo et al.

(10) Patent No.: US 12,433,454 B2
(45) Date of Patent: Oct. 7, 2025

(54) INTELLIGENT DEVICE FOR OUTPUTTING LIQUID

(71) Applicant: SHENZHEN ZISHENGXIU TECHNOLOGY CO., LTD, Shenzhen (CN)

(72) Inventors: Yifu Luo, Shenzhen (CN); Bo Wu, Shenzhen (CN)

(73) Assignee: SHENZHEN ZISHENGXIU TECHNOLOGY CO., LTD, Shenzhen (CN)

( * ) Notice: Subject to any disclaimer, the term of this patent is extended or adjusted under 35 U.S.C. 154(b) by 347 days.

(21) Appl. No.: 18/005,625

(22) PCT Filed: Sep. 16, 2020

(86) PCT No.: PCT/CN2020/115496
§ 371 (c)(1),
(2) Date: Jan. 16, 2023

(87) PCT Pub. No.: WO2022/027788
PCT Pub. Date: Feb. 10, 2022

(65) Prior Publication Data
US 2023/0271208 A1    Aug. 31, 2023

(30) Foreign Application Priority Data

Aug. 6, 2020  (CN) .......................... 202010784832.2
Aug. 6, 2020  (CN) .......................... 202021618681.5

(51) Int. Cl.
*B05B 11/10*      (2023.01)
*A47K 5/12*       (2006.01)
(52) U.S. Cl.
CPC .......... *A47K 5/1217* (2013.01); *A47K 5/1205* (2013.01); *B05B 11/1047* (2023.01)

(58) Field of Classification Search
CPC ...... A47K 5/1217; A47K 5/1205; A47K 5/14; A47K 5/16; B05B 11/1047; B05B 7/0025; B05B 7/2464; B05B 12/122; B05B 9/0861
See application file for complete search history.

(56) References Cited

U.S. PATENT DOCUMENTS

| 10,588,467 B2 * | 3/2020 | Yang ..................... F04B 43/04 |
| 2005/0133626 A1 * | 6/2005 | Hornsby ............... B05B 1/3436 |
| | | 239/351 |
| 2016/0016778 A1 | 1/2016 | Taylor |

FOREIGN PATENT DOCUMENTS

| CN | 204698422 U | 10/2015 |
| CN | 105935269 A | 9/2016 |

(Continued)

OTHER PUBLICATIONS

International Search Report and Written Opinion issued in corresponding PCT Application No. PCT/CN2020/115496, dated Apr. 23, 2021.

*Primary Examiner* — Donnell A Long
(74) *Attorney, Agent, or Firm* — Westbridge IP LLC

(57) ABSTRACT

Disclosed is an intelligent device for outputting liquid, including: a base and a cover body. The base extends into the liquid bottle, a cavity body is provided in the base for accommodating one or more of a pump, a motor and a power supply, the pump or/and the power supply is/are connected to a control assembly, a distance from a joint point of the cover body and the liquid bottle to a top surface of the cover body is less than a distance from a bottom surface of the base to the top surface of the cover body, and the cover body is connected to the base.

9 Claims, 11 Drawing Sheets

(56) References Cited

FOREIGN PATENT DOCUMENTS

| CN | 106144190 A | 11/2016 |
| CN | 111439465 A | 7/2020 |
| CN | 112078956 A | 12/2020 |

* cited by examiner

INTELLIGENT DEVICE FOR OUTPUTTING LIQUID

CROSS-REFERENCE TO RELATED APPLICATIONS

This application is the National Stage of International Application No. PCT/CN2020/115496, filed on Sep. 16, 2020, which claims priority to Chinese Patent Application Nos. 202010784832.2 and 202021618681.5, both filed on Aug. 6, 2020, the entire contents of which are incorporated herein by reference.

TECHNICAL FIELD

The present disclosure relates to the technical field of liquid transportation, in particular to an intelligent device for outputting liquid.

BACKGROUND

The liquid transportation, especially for transporting liquids in bottles, such as water, beverages, liquid soaps, condiments, edible oils, etc. In the prior art, the bottles are usually equipped with a pressing pump, or the liquids are directly poured out.

Taking a transportation of liquid soaps as an example, the liquid soaps include a hand liquid soap, a laundry detergent, a shower gel, a shampoo, a toner, a lotion and other liquids with cleaning functions or cosmetic functions. The soap device includes a container for storing the soap, and usually has a pump for discharging the soap, such as a manual push pump, an electric diaphragm pump or a peristaltic pump.

The existing soap device, for example, CN205359329U discloses an electric induction foam soap device, which includes a shell, an upper bracket, a circuit board, an electric foam device, an inner tank and a base. The circuit board used in the preset disclosure is provided with a microprocessor, an infrared sensor, an indicator light and a button, the electric foam device is provided with a foaming pump, a reducer and a motor, the reducer is provided with a lifting fork, and the base is provided with a battery compartment. When in application, the hand sanitizer is poured into the inner tank, and the battery is provided in the battery compartment. When working, the button is pressed a long time, the power is on to be in standby, the indicator light flashes intermittently. Hands are put under the foam outlet, and the infrared sensor will feed back the sensing signal to the microprocessor. The microprocessor controls the motor, and the reducer drives the lifting fork to drive the lifting movement of the piston rod of the foaming pump to pump the hand sanitizer. In the technical solution disclosed by the present application, the pump and other liquid outlet components are relatively independent from the inner tank, the pump is connected to the inner tank through pipes, and the liquid in the inner tank will not affect the operation of other components such as external pumps, motors, processors, etc. However, the volume of the inner tank is small, and more than 70% of the volume of the entire soap dispenser is occupied by components such as pumps and motors. The space layout of these components is not compact, and the utilization rate of the space is low, which results in a huge difference of the shapes of the electric soap device and the soap dispenser using the pushing pump.

CN304273857S discloses a hand sanitizer bottle, it can be seen that most of the volume of the soap dispenser adopting the push pump is a liquid bottle, which can store a large amount of soap liquid. An electric soap device can also use a larger liquid bottle, but it is difficult to have a large difference in appearance with a common hand sanitizer bottle. For example, CN106073591A discloses an induction automatic soap device, which is a relatively regular hexahedron in appearance with a large volume. Although it can store more soap liquid, the space utilization rate is not high.

SUMMARY

The present disclosure aims to solve the problem of the low utilization rate of the inner spaces of the electric liquid bottle, and to provide an intelligent device for outputting liquid.

In order to solve the technical problems, the technical solution provided by the present disclosure is:

an intelligent device for outputting liquid, including:
a base extending into a liquid bottle, and provided with a cavity body inside, the cavity body can accommodate one or more of a pump, a motor, and a power supply, and the motor or/and the power supply is/are connected to a control assembly;
a cover body which can connect to the liquid bottle, a distance from a joint point of the cover body and the liquid bottle to a top surface of the cover body is less than a distance from a bottom surface of the base to the top surface of the cover body, and a liquid outlet is provided on the cover body for outputting liquid;
the cover body is connected to the base.

A part or all of the base is deep into the liquid bottle, which fully saves a space. A connection between the base and the cover is at an upper place, and the liquid in the liquid bottle is not easy to enter the base, which fully protects a stable operation of the pump, the motor or battery. A structure of the cover body and the base is closer to the traditional liquid bottle with a pressing pump. The base is equivalent to thickening and hollowing out the liquid suction pipe extending into the bottle from the pressing pump, which is used to hold a necessary device for an automatic liquid discharge. A cross-sectional diameter of the cover of an ordinary liquid bottle is basically larger than a diameter of the suction tube, the design of the base makes full use of the remaining cross-sectional area of the cover body, which hardly increases a volume of the liquid bottle, and a shape of the liquid outlet device does not change greatly.

It improves a space utilization efficiency inside the electric liquid bottle, reduces a risk of the liquid in the liquid bottle entering the base, conforms to a minimalist design concept, and has an extremely high use value and market value.

In an embodiment, a liquid inlet is provided on the base.

In an embodiment, the liquid inlet is provided on a top of the base, and the liquid inlet is connected to a liquid inlet pipe. A siphon phenomenon is more likely to occur after the base is immersed in liquid, especially in the existing electric soap device, the liquid inlet is usually set at the bottom, so that the liquid can easily enter the pump when the pump is off, and the siphon phenomenon occurs, which damages the pump body easily. The liquid inlet is provided on a top of the base and close to the joint point of the base and the cover body, and the siphon problem can be alleviated effectively.

In an embodiment, the cavity body can accommodate the pump, the motor, and the power supply.

In an embodiment, the pump is provided on an upper part of the base, the motor and the power supply are provided below the pump, a liquid inlet and a liquid outlet of the pump are provided on a top of the pump, the liquid inlet of the pump is communicated with a liquid inlet of the cover body, and the liquid outlet of the pump is communicated with the liquid outlet of the cover body. If the pump is located at the bottom of the inner cavity body of the base, the siphon phenomenon will inevitably become more serious after the pump turns from start to rest. By optimizing the position of the pump, the siphon phenomenon can be further alleviated In an embodiment, the control assembly includes:
a detector provided on the cover body; and
a controller respectively connected to the detector, the motor, and the power supply.

The control assembly is used to control an opening or a closing of the pump, so as to control the automatic liquid outputting.

In an embodiment, the controller includes:
a first controller connected to the detector;
a second controller connected to the motor;
the power supply is connected to the first controller and the second controller, and the first controller is connected to the second controller. The first controller controls an operation of the detector and converts a photoelectric signal obtained by the detector into an electrical signal, and the second controller receives the signal transmitted by the first controller and controls an operation of the motor.

In an embodiment, an accommodating cavity is provided in the cover body, the first controller is provided in the accommodating cavity, the second controller is provided in the cavity body of the base, and the accommodating cavity is communicated with the cavity body. The first controller and the second controller are placed into two cavities respectively, a space occupied by the controllers in one cavity can be reduced, to make the space more compact, the utilization rate of the space is improved, to make it possible to adjust the shape of the soap device to a traditional liquid bottle.

In an embodiment, the pump is a foam pump.

In an embodiment, a charging portion is provided on the cover body, the charging portion is electrically connected to the controller, and a dust cover is provided on the charging portion.

In an embodiment, the cover body includes:
a face cover provided with a liquid outlet;
a face cover seat connected to the face cover, the cover body is connected to the face cover seat, a liquid outlet channel is provided in the face cover seat, and the liquid outlet channel is connected to the liquid outlet through a pipe; and
a connecting cover connected to the base for connecting to the liquid bottle. The face cover and the face cover sear can make the shape of the liquid outputting device more like the traditional liquid bottle, and a cavity formed between the face cover and the face cover seat can be used to output the liquid or control the liquid outputting.

The cavity formed between the face cover and the face cover seat is a accommodating cavity, and can accommodate the first controller, which makes the space more compact, increases the space utilization rate, and make a shape of the present disclosure more like the traditional liquid bottle.

Compared with the prior art, the present disclosure has the following advantages: the utilization efficiency of the inner space of the electric liquid bottle is improved, and the risk of the liquid in the liquid bottle entering the base, which conform to the minimalist design concept, and has an extremely high usage value and market value.

The device for outputting liquid can be made more like the traditional soap bottle.

DETAILED DESCRIPTION OF THE EMBODIMENTS

Figure 1:
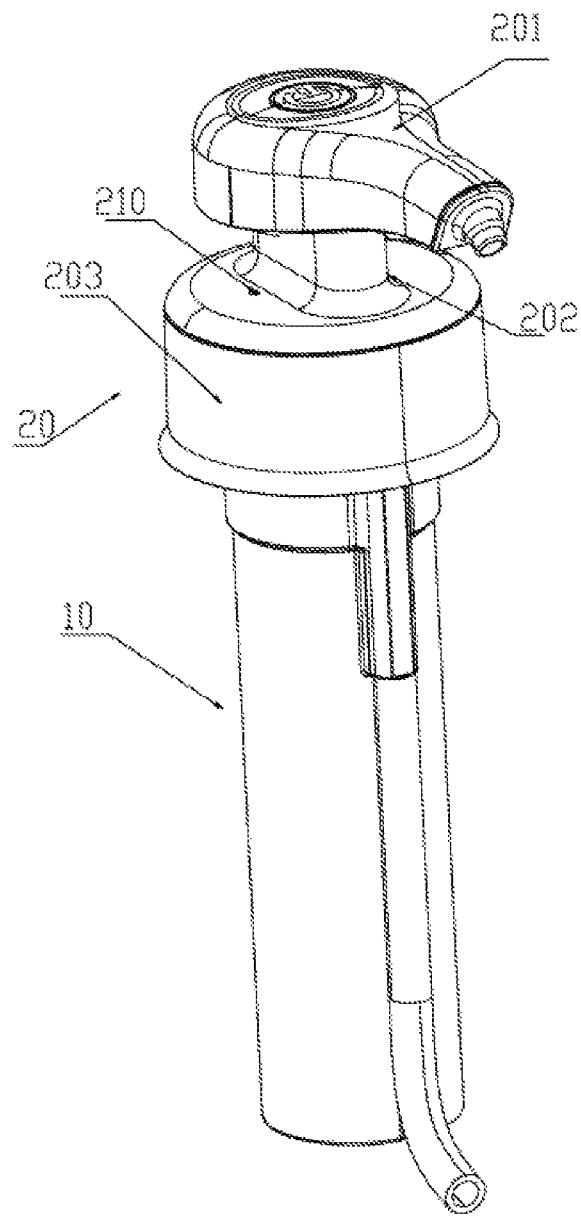
FIG. 1 is a schematic diagram of an intelligent device for outputting liquid.
Figure 2:
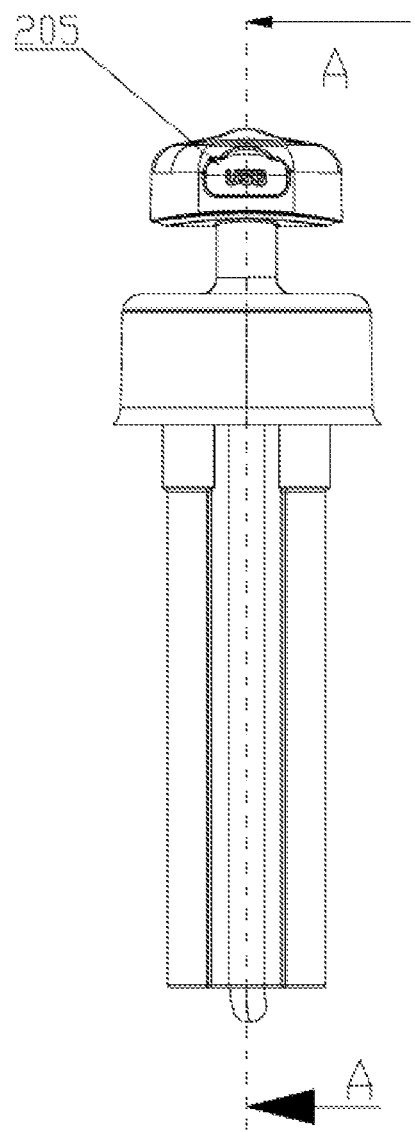
FIG. 2 is a front view of the intelligent device for outputting liquid.

The following embodiments are provided for the further description of the present disclosure, and not for a limitation of the present disclosure.

In an embodiment, the intelligent device for outputting liquid includes:
a base 10 extending into a liquid bottle 40, the base 10 is provided with a cavity body 109, the cavity body 109 can accommodate one or more of a pump 102, a motor 103, and a power supply 101, and the motor 103 or/and the power supply 101 is/are connected to a control assembly;
a cover body 20 used to connect to the liquid bottle 40, a distance from a joint point of the cover body 20 and the liquid bottle to a top surface of the cover body 20 is less than a distance from a bottom surface of the base 10 to the top surface of the cover body 20, and a liquid outlet 204 is provided on the cover body 20;
the cover body 20 is connected to the base.

Figure 9:
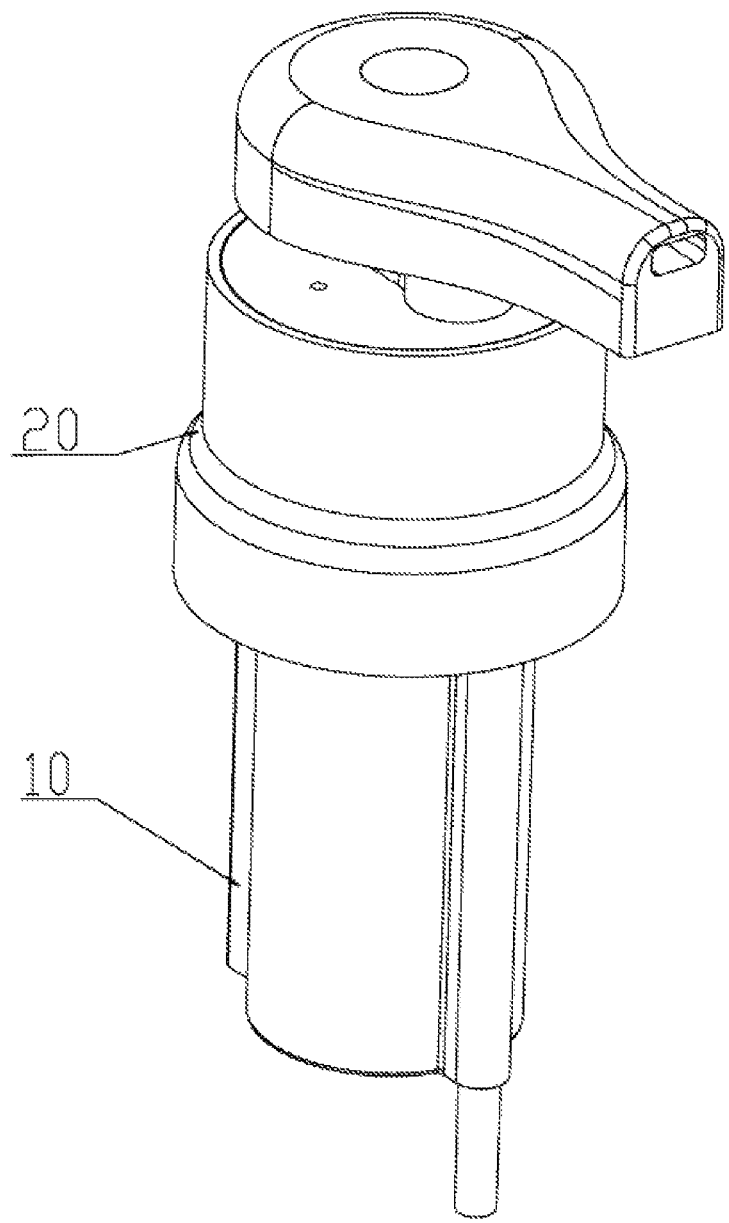
FIG. 9 is a schematic diagram of the intelligent device for outputting liquid according to another embodiment of the present disclosure.
Figure 10:
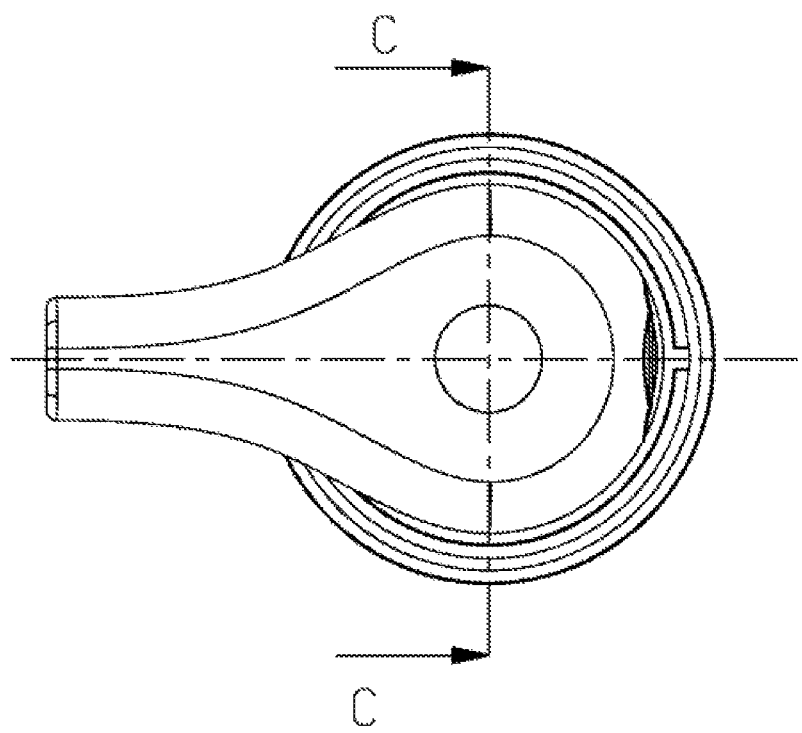
FIG. 10 is a top view of FIG. 9.
Figure 11:
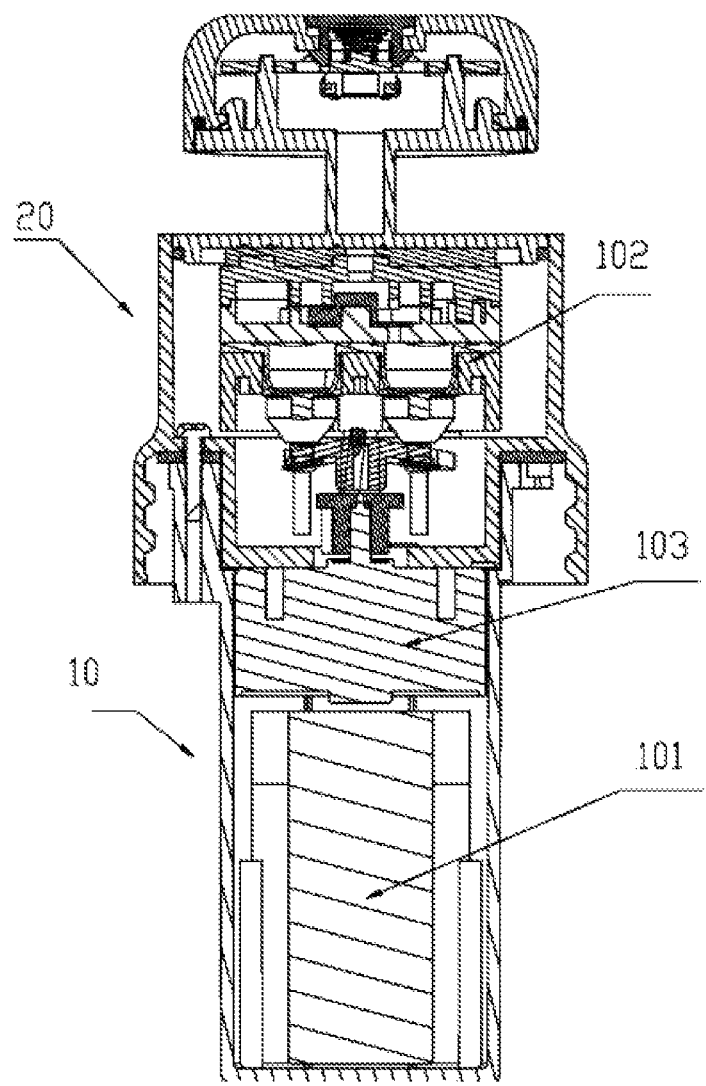
FIG. 11 is a cross-sectional view of a C-C section of FIG. 10.

In an embodiment, referring FIGS. 9 to 11, the base 10 extends into the liquid bottle 40, the cavity body 109 is provided in the base 10 and is used to accommodate a part of the pump 102, the motor 103, and the power supply 101. The motor 103 or/and the power supply 101 is/are connected to the control assembly. Another part of the pump 102 is provided in a chamber formed by the cover body 20 and the base 10. It should be understood that the base 10 of the present disclosure may only accommodate one of the motor 103, the pump 102, and the power supply 101, and others not accommodated in the base are located in a gap formed by the cover 20 and the base 10, or are placed outside.

Figure 3:
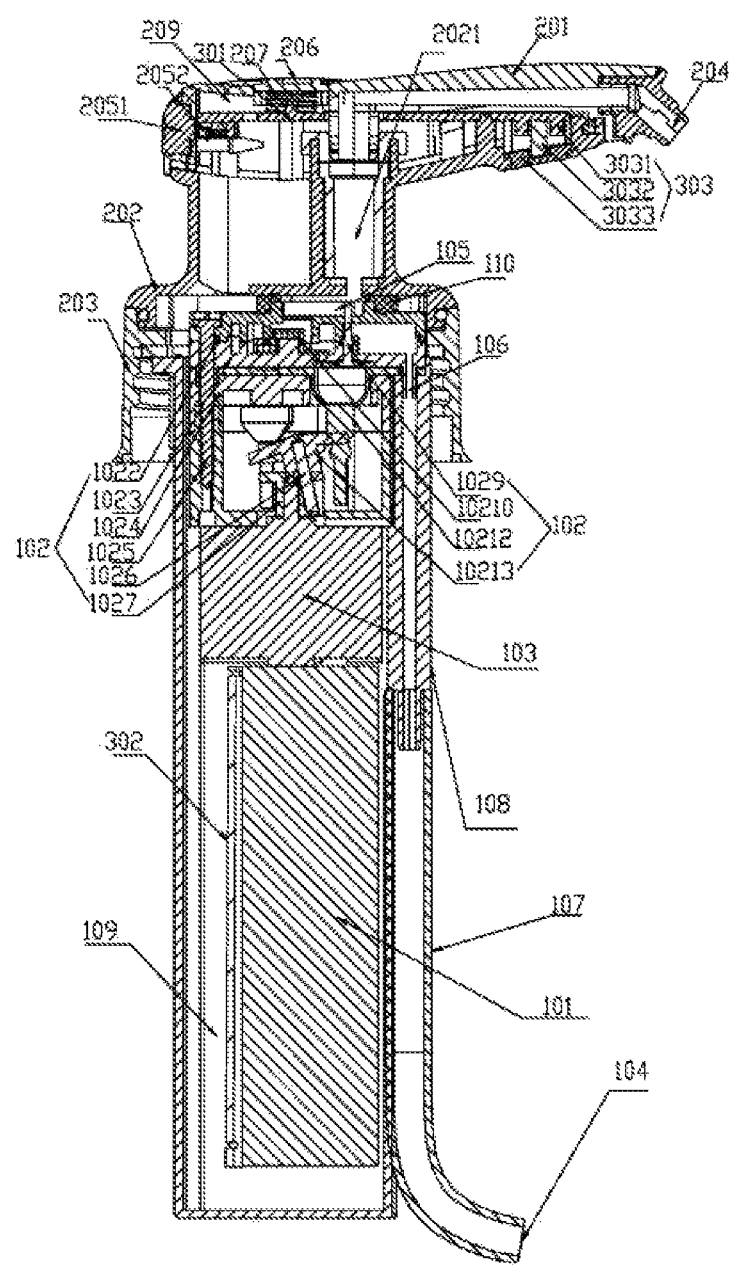
FIG. 3 is a cross-sectional view of an A-A section of FIG. 2.
Figure 4:
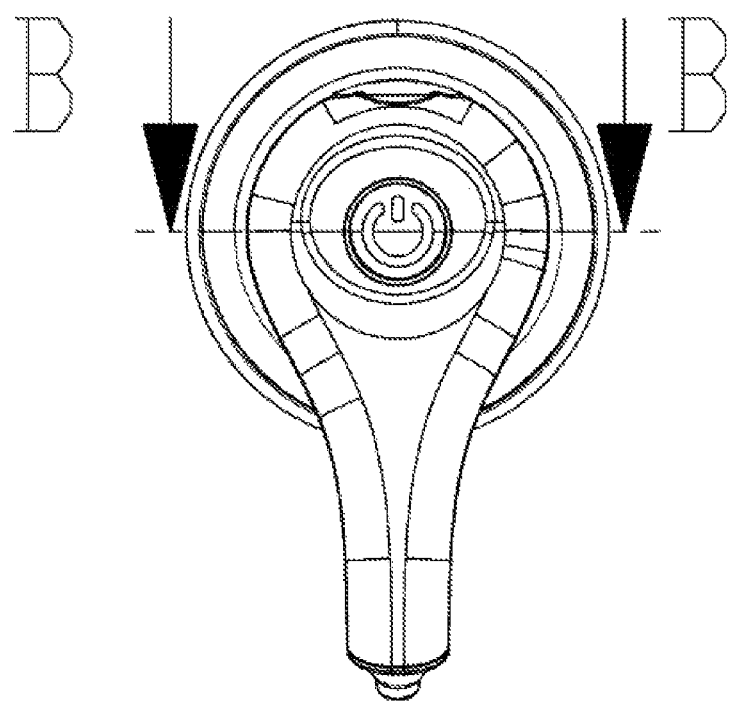
FIG. 4 is a top view of the intelligent device for outputting liquid.
Figure 5:
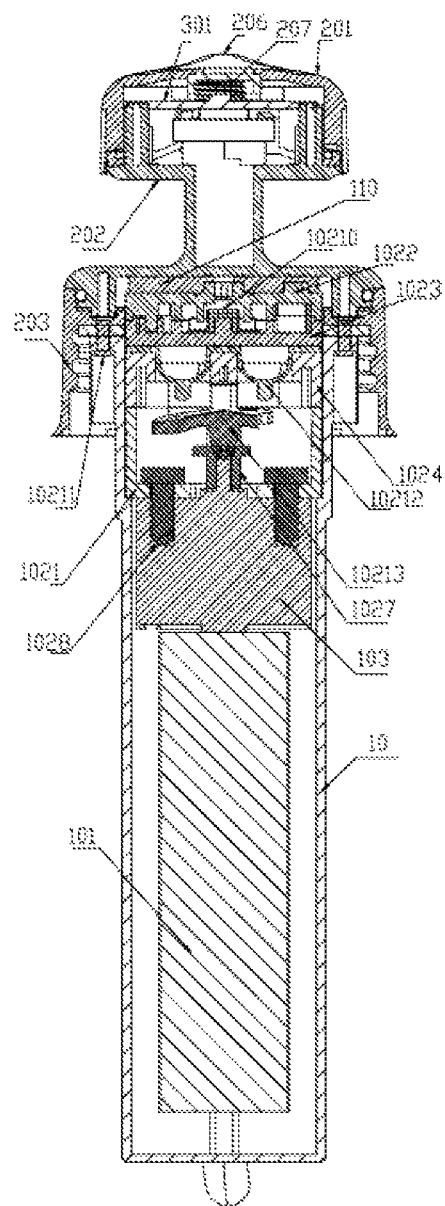
FIG. 5 is a cross-sectional view of a B-B section of FIG. 4.
Figure 6:
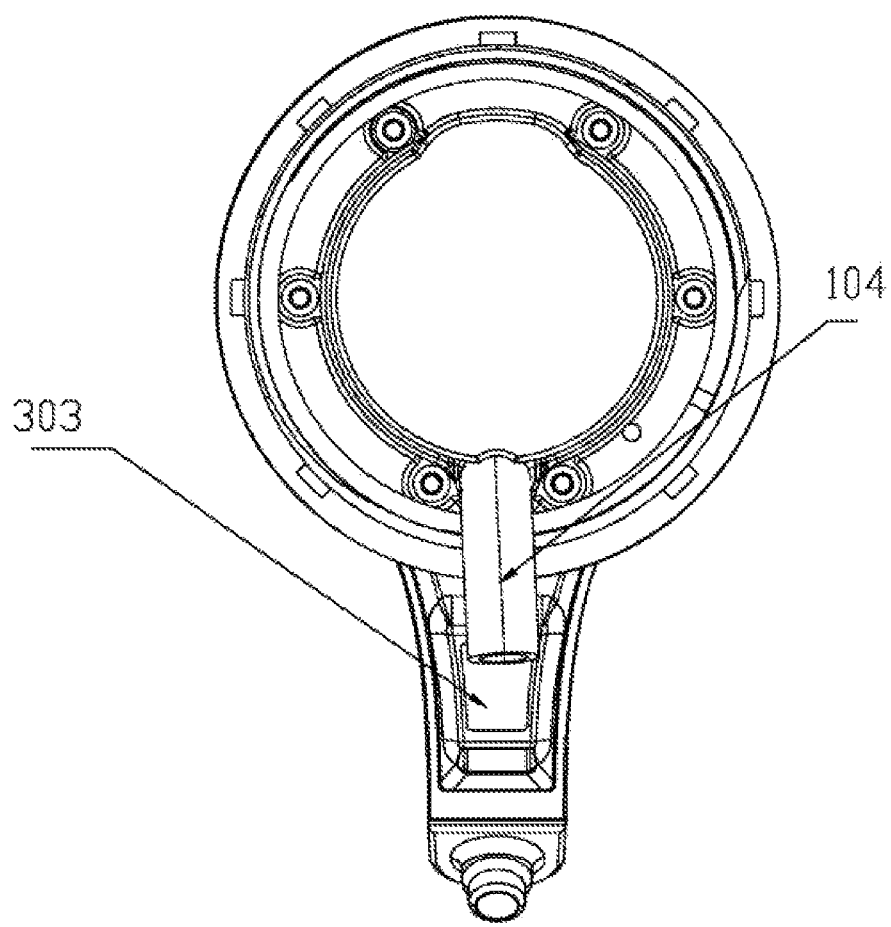
FIG. 6 is a bottom view of the intelligent device for outputting liquid.
Figure 7:
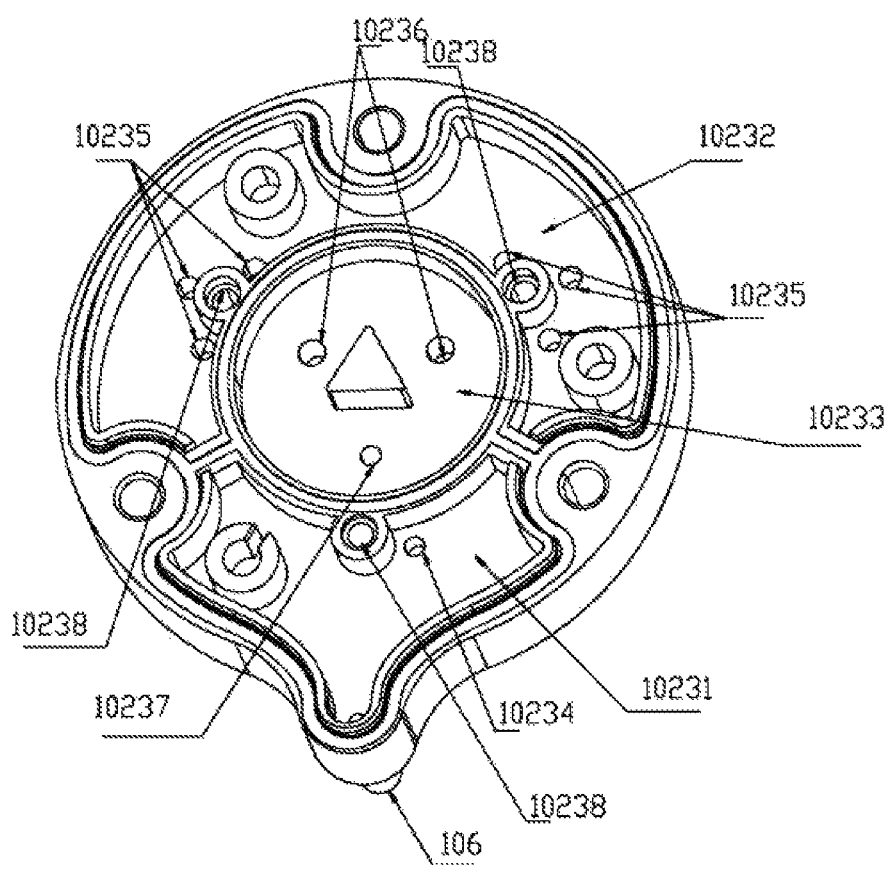
FIG. 7 is a schematic diagram of a valve seat of the intelligent device for outputting liquid.
Figure 8:
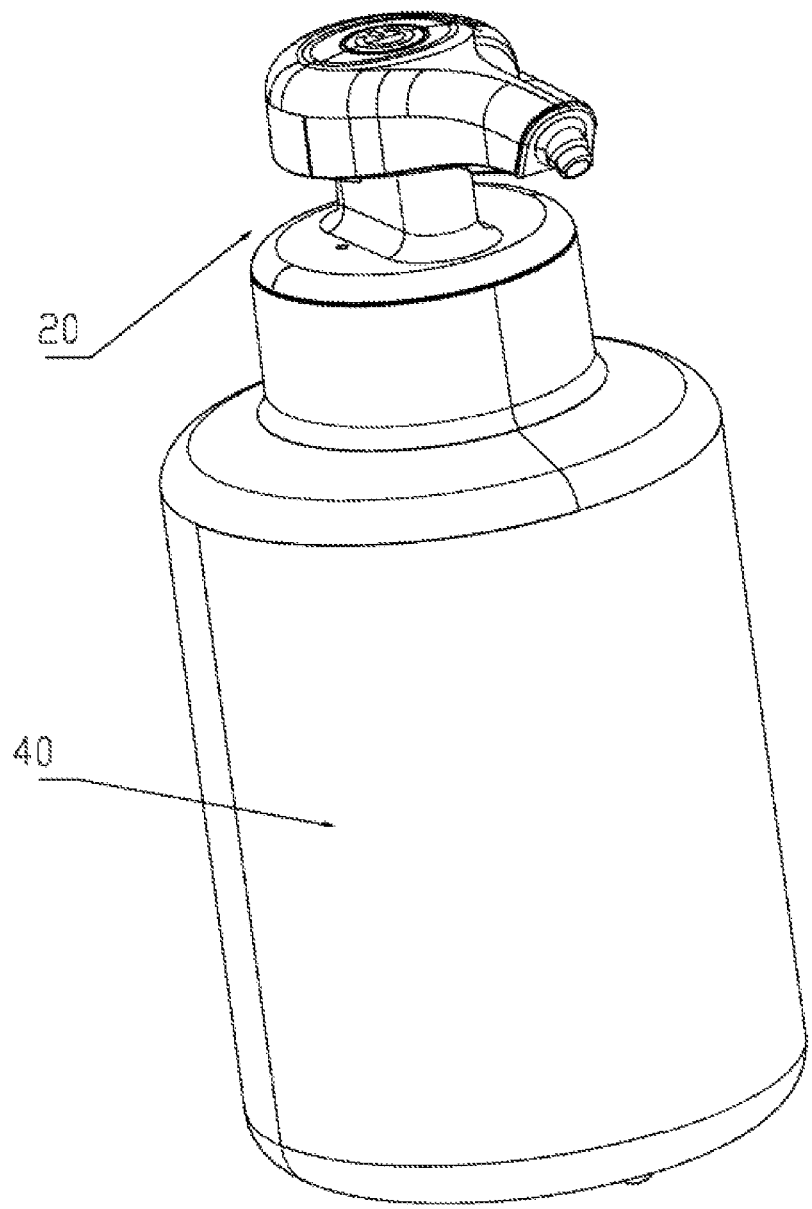
FIG. 8 is a schematic diagram of an assembly of the intelligent device for outputting liquid with the liquid bottle

In an embodiment, referring FIG. 3, the base 10 extends into the liquid bottle 40, the cavity body 109 is provided in the base 10 and is used to accommodate the pump 102, the motor 103, and the power supply 101, the motor 103 or/and the power supply 101 is/are connected to the control assembly.

In an embodiment, the cover body 20 is connected to the base 10, and a connection method includes but is not limited to one or more of: a screw connection, a snap connection or a magnetic connection.

In an embodiment, the cover body 20 is connected to the base 10 through a second screw 10211.

In an embodiment, a gasket 110 is provided at a joint point of the cover body 20 and the base 10.

A part or all of the base is penetrated into the liquid bottle 40, the space is saved. The joint point of the base 10 and the cover body 20 is at a relatively high position, and liquids in the liquid bottle 40 are not easy to enter the base 10, which fully guarantees a stable operation of the pump 102, the motor 103 or the power supply 101. A structure of the cover body 20 and the base 10 is closer to that of a traditional soap bottle. The base 10 is equivalent to thickening and hollowing out a suction pipe in an ordinary soap bottle that extends into the bottle for holding a necessary device for automatically outputting liquid. A cross-sectional diameter of the cover body 20 of an ordinary soap bottle is larger than a diameter of the suction tube. A design of the base 10 makes full use of a remaining cross-sectional area of the cover body 20, barely increasing a volume of the liquid bottle 40, and a shape of the liquid outlet device does not change a lot.

The utilization rate of the inner space of the electric soap bottle is improved, the risk of the liquid in the bottle entering the base is reduced, which conforms to the minimalist design concept, and has an extremely high use value and a market value.

In an embodiment, a liquid inlet 106 is provided at a top of the base 10, the liquid inlet 106 is connected to a liquid inlet pipe 108, and the liquid inlet pipe 108 is used to connect to the liquid in the liquid bottle 40.

A siphon phenomenon is more likely to occur after the base 10 is immersed in liquid, especially in the existing electric soap device, the liquid inlet 106 is usually set at the bottom, so that the liquid can easily enter the pump 102 when the pump 102 is off, and the siphon phenomenon occurs, which damages the pump body easily. The liquid inlet 106 is provided on a top of the base 10 and close to the joint point of the base 10 and the cover body 20, and the siphon problem can be alleviated effectively.

In an embodiment, the cavity body 109 is used to accommodate the pump 102, the motor 103, and the power supply 101.

In an embodiment, the pump 102 is provided at an upper part of the base 10, the motor 103 and the power supply 101 are provided below the pump 102, and a liquid inlet and a liquid outlet 105 of the pump 102 are both located at a top of the pump 102. The liquid inlet of the pump 102 is connected to the liquid inlet 106 of the cover body 20, and the liquid outlet 105 of the pump 102 is connected to the liquid outlet 204 of the cover body 20.

In an embodiment, the liquid inlet of the pump 102 is the liquid inlet 106.

In an embodiment, the pump 102 includes a pump base 1021 connected to the motor 103 and a pump cover 1022 connected to the pump base 1021. The liquid outlet 105 of the pump 102 and the liquid inlet 106 are provided on or close to the pump cover 1022 in the top of the pump 102.

Important electrical components are provided in the cavity body of the base, which can further save the space. If the pump 102 is provided at a bottom of the cavity body in the base 10, the siphon phenomenon will inevitably become more serious after the pump 102 is turned from on to off. The siphon phenomenon can be further alleviated by optimizing a position of the pump 102.

In an embodiment, the control assembly includes:
a detector 303 provided on the cover body 20;
a controller respectively connected to the detector 303, the motor 103 and the power supply 101.

In an embodiment, the detector 303 includes: an infrared sensor lamp 3031, a lampshade 3032, and a photoscope 3033. The infrared sensor lamp 3031 is provided above the photoscope, and the photoscope 3033 is provided above the lampshade 3032 and provided on the cover body 20. Signals can be detected by the infrared sensor lamp 3031 through the lampshade 3032 and the photoscope 3033, and the infrared sensor lamp 3031 is electrically connected to the controller. When a user's skin is detected by the infrared sensor lamp 3031, a feedback signal is sent to the controller, and the controller drives the motor 103 to work after receiving the signal.

In an embodiment, the controller includes:
a first controller 301 connected to the detector 303;
a second controller 302 connected to the motor 103;
the power supply 101 is connected to the first controller 301 or/and the second controller 302, and the first controller 301 is connected to the second controller 302.

The control assembly is used to control an open/close of the pump 102, to control an automatic liquid outlet. The first controller 301 controls an operation of the detector 303 and converts a photoelectric signal obtained by the detector 303 into an electrical signal, and the second controller 302 receives the signal transmitted by the first controller 301 and controls an operation of the motor 103.

In an embodiment, an accommodating cavity 209 is provided in the cover body 20, the first controller 301 is provided in the accommodating cavity 209, the second controller 302 is provided in the cavity body 109 of the base 10, the accommodating cavity 209 is communicated with the cavity body 109, and the first controller 301 is connected to the second controller 302 through a wire, and the wire is not shown in the figures.

The first controller 301 and the second controller 302 are placed into two cavities respectively, a space occupied by the controllers in one cavity can be reduced, to make the space more compact, the utilization rate of the space is improved, to make it possible to adjust the shape of the soap device to a traditional liquid bottle.

In an embodiment, the pump 102 is a vacuum pump.

In an embodiment, the pump 102 is a foam pump.

In an embodiment, the foam pump is a diaphragm pump or a peristaltic pump, or other pumps that can generate foam.

In an embodiment, the foam pump is a diaphragm pump.

In an embodiment, the foam pump includes a pump base 1021, a pump cover 1022, a valve seat 1023, a leather cup 10212, a leather cup seat 1024, a pin 1026, a swing frame 10213 and an eccentric wheel 1027. The pump cover 1022 is connected to the valve seat 1023, the pump cover 1022 is located on a top of the pump 102, the liquid outlet 105 and the liquid inlet 106 of the pump 102 are provided on the pump cover 1022 of the top of the pump 102 or on the valve seat 1023.

The valve seat 1023 is connected to the leather cup seat 1024, the leather cup seat 1024 is connected to the pump base 1021, a plurality of leather cups 10212 are provided on the leather cup seat 1024, a bottom of the leather cup 10212 is connected to the swing frame 10213, the eccentric wheel 1027 is connected to a rotating shaft of the motor 103, the eccentric wheel 1027 is connected to the swing frame 10213, and a pin 1026 is provided as a hardware on the eccentric wheel 1027 to play a role of a transmission force. When the motor 103 rotates, the eccentric wheel 1027 rotates to drive the swing frame 10213 to swing. The eccentric wheel 1027, the swing frame 10213 and the pin 1026 are provided in the pump base 1021.

In an embodiment, the cover body 20 is provided with an air intake hole 210. The air intake hole 210 is communicated with the pump 102.

In an embodiment, the valve seat 1023 is divided into a plurality of regions that do not interfere with each other, each region is correspondingly provided with a leather cup 10212, at least one leather cup 10212 is used for pumping the liquid, and at least one leather cup 10212 is used for pumping an air.

In an embodiment, the valve seat 1023 is divided into a plurality of regions that do not interfere with each other, the regions include at least a liquid inlet region, at least an air inlet region, and at least an air-liquid mixing region, the air-liquid mixing region is communicated with the liquid outlet 105 of the pump 102.

In an embodiment, the valve seat 1023 is divided into three regions that do not interfere with each other, the three regions include a liquid inlet region 10231, an inlet region 10232, and an air-liquid mixing region 10233. The air-liquid mixing region 10233 is communicated with the liquid outlet 105 of the pump 102. The liquid inlet region 10231 is provided with a liquid intake port 10234, the air inlet region 10232 is provided with at least two air intake ports 10235, and the air-liquid mixing region 10233 is provided with two air outlet holes 10236 and one liquid outlet hole 10237. The liquid and air sucked in by the pump 102 are mixed in the air-liquid mixing region 10233 and flow out from the liquid outlet 105.

In an embodiment, the liquid inlet region 10231 is provided with a one-way valve installation hole 10238, the air inlet region 10232 is provided with two one-way valve installation holes 10238, the liquid intake port 10234 is provided close to the one-way valve installation hole 10238 located in the liquid inlet region 10231, the air intake port 10235 is provided close to the one-way valve installation hole 10238 located in the inlet region 10232, the one-way valve installation hole 10238 is connected to the one-way valve 1029, which is an umbrella-shaped, the one-way valve 1029 covers the liquid intake port 10234, another one-way valve 1029 covers the air intake port 10235, the air-liquid mixing region 10233 is provided with an air-liquid mixing check valve 10210, the air-liquid mixing check valve 10210 covers the air outlet hole 10236 and the liquid outlet hole 10237, but the air-liquid mixing check valve 10210 does not completely cover the air-liquid mixing region 10233.

It should be understood that the air-liquid mixing check valve 10210 may not be provided.

When working, the motor 103 drives the eccentric wheel 1027 to rotate, and the eccentric wheel 1027 pushes the swing frame 10213 to reciprocate. When the swing frame 10213 moves downward, the leather cup 10212 changes from being compressed to be opened. Under a negative pressure, a sealing valve of the one-way valve 1029 connected to the valve seat 1023 is opened, and the air-liquid mixing check valve 10210 is closed. The air enters from the air inlet hole 210 of the cover body 20 to the air intake port 10235 of the valve seat 1023 and then enters the two leather cups 10212, and the liquid enters from the liquid inlet 106 to the liquid intake port 10234 of the valve seat 1023 and then enters another leather cup 10212. When the swing frame 10213 moves upward, the leather cup 10212 changes from being opened to be compressed. Under a compression force, the air-liquid mixing check valve 10210 connected to the valve 1023 is opened, and the one-way valve 1029 is closed. The air and the liquid enter the air-liquid mixing region 10233 respectively from the air outlet hole 10236 and the liquid outlet hole 10237 of the valve seat 1023 at the same time, and then enter the liquid outlet 204 through the liquid outlet 105.

In an embodiment, the cover body 20 is provided with a charging portion 205 electrically connected to the controller, and a dust cover 2051 is installed on the charging portion 205.

In an embodiment, the cover body 20 is provided with a switch 206 electrically connected to the control assembly.

In an embodiment, a spring 207 is provided below the switch 206, the switch 206 can be directly electrically connected to the control assembly, and the spring 207 only plays a role of reset. The switch 206 can also be electrically connected to the control assembly through the spring 207.

In an embodiment, the cover body 20 includes:
a face cover 201 provided with a liquid outlet 204;
a face cover seat 202 connected to the face cover 201, the cover body 20 is connected to the face cover seat 202, a liquid outlet channel 2021 is provided in the face cover seat 202, and the liquid outlet channel 2021 is connected to the liquid outlet 204 through a pipe;
a connecting cover 203 connected to the base 10 for connecting to the liquid bottle 40.

The face cover 201 and the face cover seat 202 can make an appearance of the liquid outlet device more like a traditional liquid bottle, and a cavity body is formed between the face cover 201 and the face cover seat 202, which can be used for outputting the liquid.

In an embodiment, a foaming device is provided in the liquid outlet channel 2021.

In an embodiment, the intelligent device for outputting liquid includes:
a base 10, the base 10 extends into the liquid bottle 40, a cavity body 109 is provided in the base 10 for accommodating one or more of a pump 102, a motor 103 and a power supply 101, the pump 102 is provided at an upper part of the base 10, the motor 103 and the power supply 101 are provided below the pump 102, and the liquid inlet and the liquid outlet 105 of the pump 102 are both located at the top of the pump 102. The liquid inlet of the pump 102 is the liquid inlet 106, and the liquid outlet 105 of the pump 102 is connected to the liquid outlet 204.

A control assembly, including:
a detector 303 provided on the cover body 20. The detector 303 includes: an infrared sensor lamp 3031, a lampshade 3032, and a photoscope 3033. The infrared sensor lamp 3031 is provided above the photoscope, and the photoscope 3033 is provided above the lampshade 3032 and provided on the cover body 20. Signals can be detected by the infrared sensor lamp 3031 through the lampshade 3032 and the photoscope 3033, and the infrared sensor lamp 3031 is electrically connected to the controller 301.

A controller, including:
the first controller 301 electrically connected to the infrared sensor lamp 3031 of the detector 303;
the second controller 302 electrically connected to the motor 103;
the power supply 101 is electrically connected to the first controller 301 and the second controller 302, and the first controller 301 is electrically connected to the second controller 302.

A cover body 20 used to connect the liquid bottle 40, and a distance from the joint point of the cover body 20 and the liquid bottle 40 to the top surface of the cover body 20 is less than a distance the bottom surface of the base 10 to the top surface of the cover body 20. The cover body 20 is provided with a liquid outlet 204.

The cover body 20 includes:
- a face cover 201, a liquid outlet 204 is provided on the face cover 201.
- a face cover seat 202, the face cover seat 202 is connected to the face cover 201, the cover body 20 is connected to the face cover seat 202, the face cover seat 202 is provided with a liquid outlet channel 2021, the liquid outlet channel 2021 is connected to the liquid outlet 204 through a pipe.
- a connecting cover 203, the connecting cover 203 is connected to the base 10 for connecting to the liquid bottle 40.

The cover body 20 is provided with the accommodating cavity 209, the first controller 301 is provided in the accommodating cavity 209, the second controller 302 is provided in the cavity body 109 of the base 10, and the accommodating cavity 209 is communicated with the cavity body 109.

The cover body 20 is connected to the base 10 through a second screw 10211.

A gasket 110 is provided at the joint point of the cover body 20 and the base 10.

The liquid inlet 106 is connected to the liquid inlet pipe 108, the liquid inlet pipe 108 is connected to the liquid in the liquid bottle 40 through the hose 107, the liquid inlet 106 is provided on the top of the base 10, and the liquid enters the liquid inlet pipe 108 through a port 104 of the hose.

The foam pump includes a pump base 1021, a pump cover 1022, a valve seat 1023, a leather cup 10212, a leather cup seat 1024, a pin 1026, a swing frame 10213 and an eccentric wheel 1027. The pump cover 1022 is connected to the valve seat 1023, the pump cover 1022 is provided on the top of the pump 102, the liquid outlet 105 of the pump 102 is provided on the pump cover 1022 of the top of the pump 102, and the liquid inlet 106 is provided on the valve seat 1023.

The valve seat 1023 is connected to the leather cup seat 1024, the leather cup seat 1024 is connected to the pump base 1021, the plurality of leather cups 10212 are provided on the leather cup seat 1024, the bottom of the leather cup 10212 is connected to the swing frame 10213, the eccentric wheel 1027 is connected to a rotating shaft of the motor 103, the eccentric wheel 1027 is connected to the swing frame 10213, and the pin 1026 is provided as a hardware on the eccentric wheel 1027 to plays the role of the transmission force. When the motor 103 rotates, the eccentric wheel 1027 rotates to drive the swing frame 10213 to swing. The eccentric wheel 1027, the swing frame 10213 and the pin 1026 are provided in the pump base 1021.

The valve seat 1023 is divided into three regions that do not interfere with each other, the three regions include a liquid inlet region 10231, an air inlet region 10232, and an air-liquid mixing region 10233. The air-liquid mixing region 10233 is communicated with the liquid outlet 105 of the pump 102. The liquid inlet region 10231 is provided with the liquid intake port 10234, the air inlet region 10232 is provided with at least two air intake ports 10235, and the air-liquid mixing region 10233 is provided with two air outlet holes 10236 and a liquid outlet hole 10237. The liquid and air sucked in by the pump 102 are mixed in the air-liquid mixing region 10233 and flow out from the liquid outlet 105.

The liquid inlet region 10231 is provided with the one-way valve installation hole 10238, the air inlet region 10232 is provided with two one-way valve installation holes 10238, the liquid intake port 10234 is provided close to the one-way valve installation hole 10238 located in the liquid inlet region 10231, the air intake port 10235 is provided close to the one-way valve installation hole 10238 located in the inlet region 10232, the one-way valve installation hole 10238 is connected to the one-way valve 1029, which is the umbrella-shaped, the one-way valve 1029 covers the liquid intake port 10234, another one-way valve 1029 covers the air intake port 10235, the air-liquid mixing region 10233 is provided with an air-liquid mixing check valve 10210, the air-liquid mixing check valve 10210 covers the air outlet hole 10236 and the liquid outlet hole 10237, but the air-liquid mixing check valve 10210 does not completely cover the air-liquid mixing region 10233.

The cover body 20 is provided with the charging portion 205 electrically connected to the controller, and the dust cover 2051 is installed on the charging portion 205.

The switch 206 provided on the cover body 20 is electrically connected to the control assembly, the spring 207 is provided below the switch 206, the switch 206 can be directly electrically connected to the control assembly, the spring 207 only plays the role of reset, and the switch 206 can also be electrically connected to the control assembly through the spring 207.

When the user's skin is detected by the infrared sensor lamp 3031, the feedback signal is sent to the controller, and the controller drives the motor 103 to work after receiving the signal. When working, the motor 103 drives the eccentric wheel 1027 to rotate, and the eccentric wheel 1027 pushes the swing frame 10213 to reciprocate. When the swing frame 10213 moves downward, the leather cup 10212 changes from being compressed to be opened. Under the negative pressure, the sealing valve of the one-way valve 1029 connected to the valve seat 1023 is opened, and the air-liquid mixing check valve 10210 is closed. The air enters from the air inlet hole 210 of the cover body 20 to the air intake port 10235 of the valve seat 1023 and then enters the two leather cups 10212, and the liquid enters from the liquid inlet 106 to the liquid intake port 10234 of the valve seat 1023 and then enters another leather cup 10212. When the swing frame 10213 moves upward, the leather cup 10212 changes from being opened to be compressed. Under the compression force, the air-liquid mixing check valve 10210 connected to the valve 1023 is opened, and the one-way valve 1029 is closed. The air and the liquid enter the air-liquid mixing region 10233 respectively from the air outlet hole 10236 and the liquid outlet hole 10237 of the valve seat 1023 at the same time, and enter the liquid outlet channel 2021 through the liquid outlet 105, then discharge from the liquid outlet 204 through the pipe after being fully foamed. After a certain amount of the liquid is discharged, the motor stops and waits for a next feedback signal.

It should be understood that the controller with a timing or a quantitative function can realize a function of stopping the motor after a certain amount of liquid is discharged. The corresponding circuit relationship is not repeated here.

The above detailed descriptions are specific illustrations of the feasible embodiments according to the present disclosure and are not intended to limit the scope of the present disclosure. All equivalent implementations or changes that do not depart from the present disclosure should be included in the scope of the present disclosure.

What is claimed is:
1. An intelligent device for outputting liquid, comprising:
a base extending into a liquid bottle, and provided with a cavity body inside, wherein the cavity body is config- ured to accommodate one or more of a pump, a motor, and a power supply, and the motor or/and the power supply is/are connected to a control assembly; and a cover body configured to connect to the liquid bottle, wherein a distance from a joint point of the cover body and the liquid bottle to a top surface of the cover body is less than a distance from a bottom surface of the base to the top surface of the cover body, and a liquid outlet is provided on the cover body for outputting liquid;

wherein the cover body is connected to the base, and the cavity body is configured to accommodate the pump, the motor, and the power supply.

2. The intelligent device for outputting liquid of claim 1, wherein a liquid inlet is provided on a top of the base, and the liquid inlet is connected to a liquid inlet pipe.

3. The intelligent device for outputting liquid of claim 1, wherein the pump is provided on an upper part of the base, the motor and the power supply are provided below the pump, a liquid inlet and a liquid outlet of the pump are provided on a top of the pump, the liquid inlet of the pump is communicated with a liquid inlet of the cover body, and the liquid outlet of the pump is communicated with the liquid outlet of the cover body.

4. The intelligent device for outputting liquid of claim 1, wherein the control assembly comprises:

a detector provided on the cover body; and a controller connected to the detector, the motor, and the power supply, respectively.

5. The intelligent device for outputting liquid of claim 4, wherein the controller comprises:

a first controller connected to the detector;

a second controller connected to the motor; and wherein the power supply is connected to the first controller and the second controller, and the first controller is connected to the second controller.

6. The intelligent device for outputting liquid of claim 5, wherein an accommodating cavity is provided in the cover body, the first controller is provided in the accommodating cavity, the second controller is provided in the cavity body of the base, and the accommodating cavity is communicated with the cavity body.

7. The intelligent device for outputting liquid of claim 6, wherein the pump is a foam pump.

8. The intelligent device for outputting liquid of claim 5, wherein a charging portion is provided on the cover body, the charging portion is electrically connected to the controller, and a dust cover is provided on the charging portion.

9. The intelligent device for outputting liquid of claim 1, wherein the cover body comprises:

a face cover provided with the liquid outlet;

a face cover seat connected to the face cover, wherein the cover body is connected to the face cover seat, a liquid outlet channel is provided in the face cover seat, and the liquid outlet channel is connected to the liquid outlet through a pipe; and a connecting cover connected to the base for connecting to the liquid bottle.

* * * * *